April 14, 1953  E. R. PRICE  2,634,742
VALVE FOR ADVANCING TRAILER BRAKE OPERATION
Filed Dec. 20, 1946  2 SHEETS—SHEET 2

INVENTOR.
EARL R. PRICE
BY
T. J. Plante

Patented Apr. 14, 1953

2,634,742

UNITED STATES PATENT OFFICE 2,634,742

VALVE FOR ADVANCING TRAILER BRAKE OPERATION

Earl R. Price, South Bend, Ind., assignor to Bendix Aviation Corporation, South Bend, Ind., a corporation of Delaware Application December 20, 1946, Serial No. 717,429

10 Claims. (Cl. 137—103)

This invention relates to valves for advancing trailer brake operation in tractor-trailer braking systems. Valves of this type, which are often referred to as "advance valves," are used in power brake hookups to cause the trailer brakes to be partially applied before the tractor brakes come into action. This reduces the tendency of the trailer to "jack-knife" and also softens the jolt at the kingpin caused by the trailer riding up on the tractor.

In my previously filed applications—Serial Nos. 515,539 (now Patent No. 2,429,194, issued October 14, 1947), 549,967 (now Patent No. 2,429,196, issued October 14, 1947), and 636,319 (now Patent No. 2,434,050, issued January 6, 1948)—I have disclosed various "advance valves," all of which are located on the trailer vehicle of a tractor-trailer combination. While the advance valve of Patent No. 2,429,194 could be transferred to the tractor without impairing its effective operation, the advance valves of the other two applications are combined with the trailer relay valves and are therefore not adapted for mounting on the tractor.

Although an advance valve carried by the trailer vehicle provides the desired function, there are certain advantages connected with the use of an advance valve which is mounted on the tractor, rather than the trailer. In the commercial use of tractor-trailer combinations, it is customary for a single tractor to be used for hauling numerous different trailers. The tractor leaves one trailer at its destination and picks up another for the next haul. This means that the driver of the tractor becomes accustomed to operating a single tractor used in conjunction with a variety of trailers. If the advance valves are mounted on the trailers, and if some trailers have such valves while others do not, the driver of the tractor will have to make changes in his driving habits when he substitutes a trailer having an advance valve for one which does not, or vice versa. On the other hand, if the advance valve is mounted on the tractor, the "advance" effect will be present regardless of the particular trailer which is being hauled, and the driver can accustom himself to a fairly consistent brake operation, even though the construction and effectiveness of the brakes of different trailers may be expected to differ somewhat.

In view of the considerations explained above, it is an object of the present invention to provide an advance valve which can be mounted on the tractor and connected to the brakes of any trailer which the tractor may haul.

A further object of the present invention is to provide an advance valve which will obtain the object mentioned in the preceding paragraph, while at the same time having a construction and operation improved with respect to the advance valve disclosed in the aforementioned Patent No. 2,429,194.

Other objects and advantages of the present invention will become apparent during the following discussion, reference being had therein to the accompanying drawings, in which.

Figure 1:
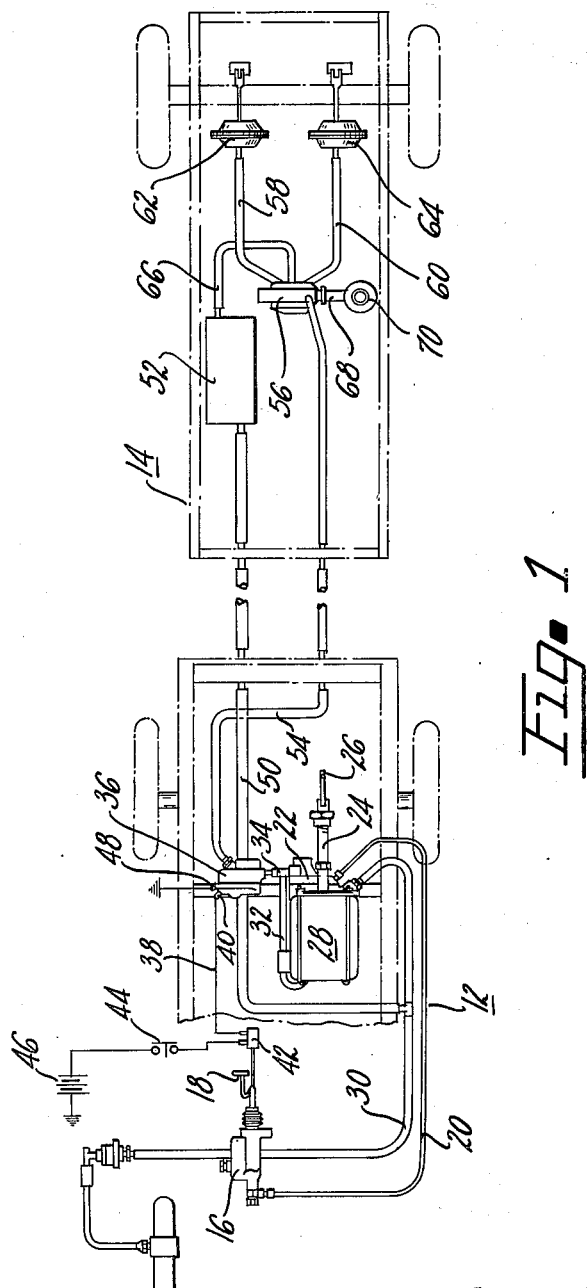
Figure 1 is a diagrammatic showing of a tractor-trailer power brake hookup which incorporates the improved advance valve.

Referring to Figure 1, a tractor 12 is shown coupled to a trailer 14. The brake hookup on the tractor may consist of a hydraulic-vacuum power braking system, similar to the one disclosed in Price Pat. No. 2,353,755, issued July 18, 1944. A master cylinder 16, operated by a pedal 18, is hydraulically connected by conduit 20 both to control valve 22 and to auxiliary master cylinder 24, the latter being connected by conduit 26 to the wheel cylinders (not shown). The power cylinder 28 is of the vacuum-suspended type, i. e. it has, when in released position, a condition of maximum available vacuum on both sides of its piston. The end of the power cylinder nearest auxiliary master cylinder 24 is connected to a vacuum source, such as the usual intake manifold, by means of a pipe 30. The other end of the power cylinder is connected by a pipe 32 to the control chamber of the control valve 22.

The control chamber of control valve 22 is also connected, by means of pipe 34, to the advance valve 36. An electrical circuit also participates in the regulation of the advance valve, the circuit including a wire 38 connecting terminal 40 carried by the advance valve casing to a normally open switch 42, which is operated by movement of the pedal 18. The ignition switch 44 may also be included in the circuit. Electrical current is supplied by the battery 46, one terminal of which is grounded, as is also the terminal 48 carried by the advance valve.

The elements thus far discussed are all mounted on the tractor, and constitute a permanent part of the braking system, insofar as the driver is concerned. The remaining units, which are carried by the trailer, are adapted to be connected to the tractor lines to be operated thereby.

The tractor vacuum pipe 50 is connected to the vacuum reservoir 52 on the trailer, and the tractor control line 54, which leads from the advance valve 36, is connected to the relay-conversion valve 56 on the trailer. The trailer relay-conversion valve is connected by pipes 58 and 60 to the trailer power cylinders 62 and 64, which operate the trailer brakes, and by pipes 66 and 68 to the vacuum reservoir 52 and air cleaner 70, respectively.

Figure 3:
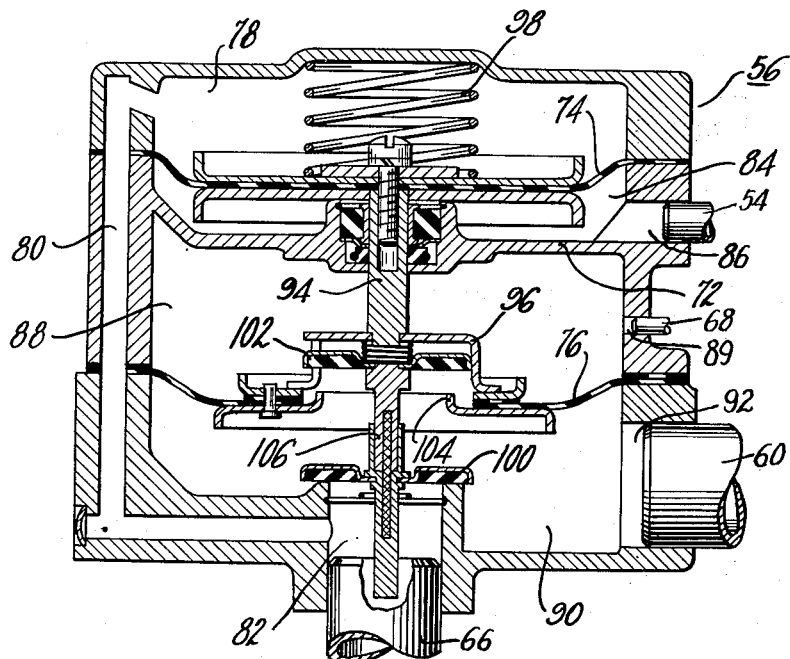
Figure 3 is a section taken through the trailer relay-conversion valve.

Because the trailer power cylinders 62 and 64 are atmosphere-suspended (have air at atmospheric pressure on both sides of their pistons when released), while the tractor power cylinder 28 is vacuum suspended, the valve 56 has a "conversion" function in addition to its "relay" function, and it is therefore referred to as a "relay-conversion valve." Figure 3, which shows the relay-conversion valve in section, discloses that it is divided into two sections by a partition 72, the sections being in turn subdivided by means of diaphragms 74 and 76 to form a total of four chambers. Upper chamber 78 is connected by means of passage 80 with the vacuum port 82 which opens into pipe 66 leading to the vacuum reservoir. Chamber 84 is connected through port 86 to the control line 54, which leads to the advance valve on the tractor. Chamber 88 is connected by means of an atmosphere port 89 with the pipe 68, which leads to air cleaner 70. The lower chamber 90 has two ports 92 (one of which is not shown) which are connected to the pipes 58 and 60 leading to the trailer power cylinders.

The upper diaphragm 74 is connected, by means of rod 94 and a tripod 96, with the lower diaphragm 76. A spring 98, when the power braking system is in released condition, biases the interconnected diaphragms to the position shown.

Communication of chamber 90 selectively with vacuum port 82 or atmosphere chamber 88 is controlled by interconnected poppets 100 and 102. In the position shown (with brakes released and motors running) the vacuum poppet 100 is seated while the atmosphere poppet 102 is held away from its seat 104 by means of the stem 106. The rod 94 and the stem 106 are two separable pieces whereby the poppets may move relatively apart.

Referring briefly to operation of the power brake hookup thus far discussed, without reference to the advance valve, pressure by the operator on pedal 18 causes liquid to be displaced from master cylinder 16 through conduit 20 to control valve 22 and auxiliary master cylinder 24. Pressure of the liquid operates control valve 22, causing the valve to admit air through pipe 32 into the left end of power cylinder 28. The joint effort of the power cylinder 28 and of the hydraulic liquid displaced from master cylinder 16 thereafter acts on the piston in auxiliary master cylinder 24, causing the same to displace liquid under pressure to the wheel cylinders. At the same time the control valve 22 (ignoring, for the time being, advance valve 36) admits air to pipes 34 and 54, which lead to chamber 84 of relay-conversion valve 56.

Prior to the admission of air into chamber 84, the fluid, or pneumatic, pressures in the relay valve have been balanced, owing to the presence of vacuum on both sides of diaphragm 74, and the presence of air at atmospheric pressure on both sides of diaphragm 76. When air is admitted to chamber 84, it develops an unbalanced condition tending to move the interconnected diaphragms upwardly. As the diaphragms move upwardly, valve seat 104 engages poppet 102, shutting off chamber 90 from the atmosphere, and subsequently poppet 100 is pulled off its seat, connecting chamber 90 to the vacuum port. Due to the evacuation of air from chamber 90, a pressure differential is developed over the pistons of power cylinders 62 and 64, causing application of the trailer brakes. The evacuation of air from chamber 90 results also in a pressure differential over diaphragm 76, which opposes the pressure differential acting on diaphragm 74. When the upward force of diaphragm 74 is balanced by the downward force of diaphragm 76 (neglecting spring resistance) the relay valve attains a "lapped" condition (in which both poppets 100 and 102 are seated) and ceases to increase the pressure differential acting to apply the trailer brakes.

The system thus far described provides conventional operation of a tractor-trailer power braking system. I have found that operation of such a system can be improved by utilizing an advance valve, such as the valve 36, which causes the trailer brakes to be applied ahead of the tractor brakes. The initial application of the trailer brakes is preferably light, but it does serve to obtain the advantages cited in the forepart of this specification. After the tractor brakes come into operation, the "advance" of the trailer brakes relative to the tractor brakes gradually diminishes until it disappears entirely prior to "run-out" (full application) of the tractor-trailer brakes.

Figure 2:
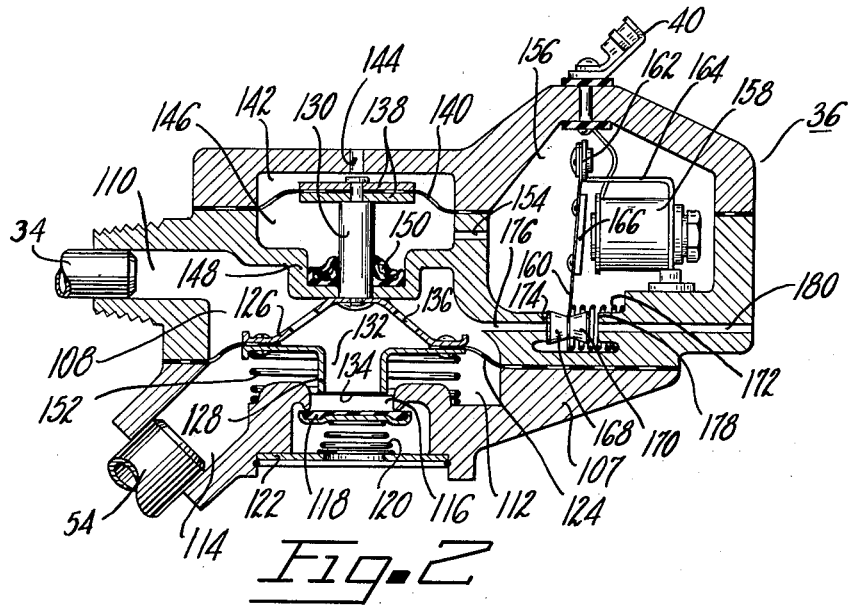
Figure 2 is a section taken through the advance valve.

The advance valve 36, shown in section in Figure 2, has a multiple-piece casing 107 which provides several chambers, or compartments. A chamber 108 is connected by means of a port 110 to pipe 34, which leads from the control valve 22. A chamber 112 has a port 114 connecting it to pipe 54, which leads to the relay-conversion valve 56. Chamber 112 also has an atmosphere port 116 which, in released position, is closed by a poppet 118, the poppet being biased to closed position by a spring 120 supported by a washer 122. A diaphragm 124 has its inner edge clamped between two metal elements 126 and 128, the first of which connects the diaphragm asembly to a rod 130, and the second of which provides a passage 132 which interconnects chambers 108 and 112 in released position, and also provides a valve seat 134 which cuts off communication between chambers 108 and 112 when it engages the poppet 118. Element 126 has openings 136 which permit communication between chamber 108 and passage 132.

The upper end of rod 130 is secured, by means of metal plates 138, to a relatively small diameter diaphragm 140, the combined diaphragm assemblies, including both diaphragms 124 and 140, being movable as a unit under the influence of pneumatic pressures acting thereon. Chamber 142, which is located on one side of diaphragm 140, is in communication with the atmosphere through aperture 144. Chamber 146, located on the other side of diaphragm 140, is sealed off from chamber 108 by means of a partition 148 and a leather seal 150 which encircles rod 130.

A return spring 152, which is supported by the wall of chamber 112, acts against metal element 128 to urge the combined diaphragm assembly upwardly to released position, as shown. The spring 152 is not a particularly heavy spring, but it must be strong enough to lift the weight of the combined diaphragm assemblies, plus overcoming the friction of the seal 150, plus opposing a force created by a maximum pressure differential acting on the cross-sectional area of the rod 130.

Chamber 146, located just below diaphragm 140, is connected by means of a passage 154 with a compartment 156 provided in the advance valve casing. Mounted in compartment 156 is a solenoid, or electro-magnet, 158, which has a coil connected to the terminals 40 and 48 in the electrical circuit previously described. A flat spring lever 160 is pivotally mounted, or fulcrumed, at 162 on a supporting arm 164, and carries a pad, or armature, 166 made of material which will be attracted by the electro-magnet when the latter is energized.

The lower end of spring lever 160 carries two valve elements 168 and 170. In released position valve element 168 is caused by spring 172 to seat at 174, as shown, thereby closing passages 176, which would otherwise provide communication between chamber 108 and compartment 156. When the electro-magnet is energized, armature 166 is drawn toward it, causing valve element 170 to seat at 178 and close passage 180, which normally provides communication between compartment 156 and the atmosphere.

Prior to operation of the tractor-trailer braking system, the components of the advance valve are in the positions shown. Chambers 108 and 112 are interconnected and both have a condition of maximum vacuum. Chambers 142 and 146 are both at atmospheric pressure, the former being open to the atmosphere through aperture 144, and the latter being in communication with the atmosphere through passage 154, compartment 156, and passage 180.

When the driver depresses the pedal 18, the switch 42 is caused to close immediately (preferably before the pedal has been depressed far enough to initiate a brake application on the tractor) and, assuming the ignition switch 44 is closed, the electrical circuit will be completed, energizing the electro-magnet 158. Energization of the electro-magnet draws the armature 166 toward the right, unseating valve element 168, and seating valve element 170. This cuts off communication between chamber 146 and the atmosphere, and connects said chamber to chamber 108 (through passage 154, compartment 156, and passage 176). Since chamber 108 still has a maximum vacuum condition, the air in chamber 146 will be promptly evacuated, resulting in a vacuum condition below diaphragm 140.

The pressure differential acting on diaphragm 140 will force it downwardly, and rod 130, overcoming spring 152, will first cause valve seat 134 to engage poppet 118, cutting off communication between chambers 108 and 112, and thereafter unseat poppet 118 from port 116. This permits air to enter chamber 112 and to pass through port 114 and pipe 54 to relay-conversion valve 56, causing operation of the relay valve and partial application of the trailer brakes, in accordance with the principles of operation heretofore discussed.

The initial operation of the trailer brakes caused by the advance valve is, of course, only partial. In other words, only a small pressure differential is developed over the pistons of the trailer power cylinders prior to actuation of the entire braking system by control valve 22.

The amount of power developed initially by the trailer power cylinders, depends upon the proportions of the diaphragms 124 and 140 in the advance valve. The effective surface area of diaphragm 140 is, as shown, much smaller than the effective surface area of diaphragm 124 (effective area being taken as the area of the metal plates plus one-half the exposed area of the rubber diaphragm). When the desired amount of trailer advance has been selected, the diaphragm areas are selected accordingly. In other words, if the trailer "advance" is to be equivalent to a pressure differential of five inches of mercury (roughly the same as a pressure of 2.5 pounds per square inch), the area of diaphragm 140 should be such that, for a given area of diaphragm 124 and a given strength of spring 152, the downward force produced by a full differential over diaphragm 140 will just equal the force of spring 152 plus the upward force produced by diaphragm 124 when the latter is subjected to a pressure differential of five inches of mercury.

When the upward and downward pneumatic pressure forces in the advance valve reach equilibrium after energization of the electro-magnet, the advance valve will be in "lapped" position, with poppet 118 seated at 116, and valve seat 134 engaging the poppet. When the pedal has been depressed sufficiently to cause operation of control valve 22, the vacuum in chamber 108 will be gradually destroyed by the admission of air. This increase of pressure in chamber 108 will again unbalance the forces in the advance valve, reopening atmosphere port 116, and progressively increasing the extent of application of the trailer brakes. As the brake application progresses on both vehicles, the trailer power units will continue to run "ahead" of the tractor power unit until full application is nearly reached, owing to the "advancing" effect of the small diaphragm 140. However, as the absolute pressure in chamber 108 increases, the pressure in chamber 146 also increases (because of their intercommunication) until full atmospheric pressure is reached in the latter chamber, at which time diaphragm 140 is balanced, and ceases to be effective. As a matter of fact, the "advance" diaphragm 140 becomes ineffective as soon as the force produced by it is inadequate to overcome the return spring 152.

During release of the brakes, the trailer brakes are subjected to more "power" during the interval between the point at which the advance diaphragm begins to be effective, and the point at which the electro-magnet is deenergized. In general, release is brought about by removing pressure on the pedal, which permits the return springs throughout the brake control system to return the parts to their original, or released, positions.

Although a particular embodiment of my invention has been described, it will be understood by those skilled in the art that the object of the invention may be attained by the use of constructions different in certain respects than that disclosed without departing from the underlying principles of the invention. I therefore desire by the following claims to include within the scope of my invention all such variations and modifications by which substantially the results of my invention may be obtained through the use of substantially the same or equivalent means.

I claim:

1. An advance valve, for insertion in a fluid pressure system between a controlling pressure and a controlled pressure, comprising a first chamber having a port connected to the controlled pressure and a port communicating with the atmosphere, a valve element controlling the atmosphere port, a spring biasing said valve element to closed position, a second chamber having a port connected to the controlling pressure, which provides a vacuum condition at said port when the system is idle, a first diaphragm between the first and second chambers having a passage therethrough to provide intercommunication between the first and second chambers, a third chamber communicating with the atmosphere, a fourth chamber adapted to be selectively placed in communication either with the atmosphere or with the second chamber, a valve element biased to a position in which it permits communication between the fourth chamber and the atmosphere while preventing communication between the fourth chamber and the second chamber, said valve element being movable to a position in which it permits communication between the fourth chamber and the second chamber while preventing communication between the fourth chamber and the atmosphere, independently operable means for controlling said valve element, a second diaphragm between the third and fourth chambers, a mechanical connection between said first and second diaphragms which causes them to move together, the diaphragms being movable, when a pressure differential is developed over the second diaphragm, to first close the passage through the first diaphragm by bringing it into engagement with the first-mentioned valve element and thereafter unseat said valve element to connect the first chamber with the atmosphere.

2. An advance valve, for insertion in a fluid pressure system between a controlling pressure and a controlled pressure comprising a first chamber having a port connected to the controlling pressure and a port communicating with a pressure source, a valve element controlling the latter port, a spring biasing said valve element to closed position, a second chamber having a port connected to the controlling pressure, a first diaphragm between the first and second chambers having a passage therethrough to provide intercommunication between the first and second chambers, a third chamber communicating with the aforementioned pressure source, a fourth chamber adapted to be selectively placed in communication either with said pressure source or with the second chamber, a valve element biased to a position in which it permits communication between the fourth chamber and the pressure source while preventing communication between the fourth chamber and the second chamber, said valve element being movable to a position in which it permits communication between the fourth chamber and the second chamber while preventing communication between the fourth chamber and the pressure source, means for controlling said valve element, a second diaphragm between the third and fourth chambers, the first and second diaphragms being interconnected to move together, the diaphragms being movable, when a pressure differential is developed over the second diaphragm, to first close the passage through the first diaphragm by bringing it into engagement with the first-mentioned valve element and thereafter unseat said valve element to connect the first chamber with the pressure source.

3. An advance valve, for insertion in a fluid pressure system between a controlling pressure and a controlled pressure, comprising a first pressure responsive movable member having one side subjected to controlling pressure and the other side subjected to controlled pressure, a second pressure responsive movable member connected to said first member and having one side subjected to a constant pressure, means operatively associated with said second member to selectively subject the other side of said second member either to said constant pressure or to the controlling pressure, and valve means controlled by movement of said pressure responsive movable members for controlling the aforementioned controlled pressure.

4. An advance valve, for insertion in a fluid pressure system between a controlling pressure and a controlled pressure, comprising a first chamber having a port connected to the controlled pressure and a port communicating with a pressure source, a first valve element controlling the latter port, means biasing said valve element to closed position, a second chamber having a port connected to the controlling pressure, a first pressure responsive movable wall between the first and second chambers having a passage therethrough, a third chamber communicating with the aforementioned pressure source, a fourth chamber adapted to be selectively placed in communication either with the pressure source or with the second chamber, a second valve element biased to a position in which it permits communication between the fourth chamber and the pressure source while preventing communication between the fourth chamber and the second chamber, said second valve element being movable to a position in which it permits communication between the fourth chamber and the second chamber while preventing communication between the fourth chamber and the pressure source, means for controlling said second valve element, a second pressure responsive movable wall between the third and fourth chambers, the first and second movable walls being interconnected to move together, the movable walls being urged, when a pressure differential is developed over the second movable wall, to first engage said first valve element to close the passage through the first movable wall and thereafter unseat the first-mentioned valve element to connect the first chamber with the pressure source.

5. An advance valve, for insertion in a fluid pressure system between a controlling pressure and a controlled pressure, comprising a first chamber having a port connected to the controlled pressure and a port communicating with a pressure source, a valve element controlling the latter port, a second chamber having a port connected to the controlling pressure, a first pressure responsive movable wall between the first and second chambers having a passage therethrough cooperating with said valve element, a third chamber communicating with the aforementioned pressure source, a fourth chamber adapted to be selectively placed in communication either with the pressure source or with the second chamber, a second valve element biased to a position in which it permits communication between the fourth chamber and the pressure source while preventing communication between the fourth chamber and the second chamber, said second valve element being movable to a position in which it permits communication between the fourth chamber and the second chamber while preventing communication between the fourth chamber and the pressure source, and a second pressure responsive movable wall between the third and fourth chambers, the first and second movable walls being interconnected to move together.

6. An advance valve, for insertion in a fluid pressure system between a controlling pressure and a controlled pressure, comprising a first chamber having a port connected to the controlled pressure and a port communicating with a pressure source, a second chamber having a port connected to the controlling pressure, means for at times interconnecting the first and second chambers, a first pressure responsive movable member balanced between the pressure in the first and second chambers, a third chamber having a substantially invariable pressure condition, a fourth chamber adapted to be selectively placed in communication either with the pressure condition of the third chamber or with the pressure condition of the second chamber, valve means controlling the pressure in said fourth chamber, a second pressure responsive movable member balanced between the pressures of the third and fourth chambers, the first and second movable movable members being interconnected to move together, and valve means operated by movement of said movable members for selectively placing the first chamber in communication either with the second chamber or with the pressure source.

7. An advance valve, for insertion in a fluid pressure system between a controlling pressure and a controlled pressure comprising a first chamber having a port connected to the controlled pressure and a port communicating with the atmosphere, a first valve element controlling the atmosphere port, a spring biasing said valve element to closed position, a second chamber having a port connected to the controlling pressure which provides a vacuum condition at said second chamber port when the system is idle, a first diaphragm between the first and second chambers having a passage through the center to provide intercommunication between the first and second chambers, a third chamber communicating with the atmosphere, a fourth chamber adapted to be selectively placed in communication either with the atmosphere or with the second chamber, a second valve element biased to a position in which it permits communication between the fourth chamber and the atmosphere while preventing communication between the fourth chamber and the second chamber, said second valve element being movable to a position in which it permits communication between the fourth chamber and the second chamber while preventing communication between the fourth chamber and the atmosphere, an electro-magnetic relay arranged when energized to move said second valve element to the latter position, said relay being adapted to be operated independently of the aforementioned controlling pressure, a second diaphragm between the third and fourth chambers, said second diaphragm having a smaller effective area than the first diaphragm, a mechanical connection between said first and second diaphragms which causes them to move together, the diaphragms being movable, when a pressure differential is developed over the second diaphragm, to first close the passage through the center of the first diaphragm by bringing it into engagement with the first-mentioned valve element and thereafter unseat said first valve element to connect the first chamber with the atmosphere.

8. An advance valve, for insertion in a fluid system between a controlling pressure and a controlled pressure comprising a first chamber having a port connected to the controlled pressure and a port communicating with the atmosphere, a first valve element controlling the atmosphere port, a spring biasing said valve element to closed position, a second chamber having a port connected to the controlling pressure which provides a vacuum condition at said second chamber port when the system is idle, a first diaphragm between the first and second chambers having a passage therethrough to provide intercommunication between the first and second chambers, a third chamber communicating with the atmosphere, a fourth chamber adapted to be selectively placed in communication either with the atmosphere or with the second chamber, a second valve element biased to a position in which it permits communication between the fourth chamber and the atmosphere while preventing communication between the fourth chamber and the second chamber, said second valve element being movable to a position in which it permits communication between the fourth chamber and the second chamber while preventing communication between the fourth chamber and the atmosphere, an electrical control arranged when energized to move said second valve element to the latter position, a second diaphragm between the third and fourth chambers, said second diaphragm having a smaller effective area than the first diaphragm, a mechanical connection between said first and second diaphragms which causes them to move together, the diaphragms being movable, when a pressure differential is developed over the second diaphragm, to first close the passage through the first diaphragm by bringing it into engagement with the first-mentioned valve element and thereafter unseat said first valve element to connect the first chamber with the atmosphere.

9. An advance valve, for insertion in a fluid system between a controlling pressure and a controlled pressure comprising a first pressure responsive movable member having one side subjected to the controlling pressure and the other side subjected to the controlled pressure, a second pressure responsive movable member connected to said first member and having one side subjected to a constant pressure and the other side selectively subjected either to said constant pressure or to the controlling pressure, first valve means for controlling the selection of pressures acting on the other side of said second member, and second valve means separate from said first valve means controlled by movement of said pressure responsive movable members for controlling the aforementioned controlled pressure.

10. An advance valve for use in a fluid pressure system comprising a first compartment which is divided into first and second variable volume chambers by a first pressure responsive movable member, the first chamber having a port adapted to be connected to a pressure source and another port arranged to be connected to a controlled pressure, a second compartment which is divided into third and fourth variable volume chambers by a second pressure responsive movable member, said third chamber being arranged for constant communication with a pressure source, means connecting said movable members to move together, means to selectively place said fourth chamber in communication with either said second chamber or said third chamber, and valve means operated by movement of said movable members for selectively placing said first chamber in communication either with said second chamber or with the first-mentioned pressure source.

EARL R. PRICE.

References Cited in the file of this patent

UNITED STATES PATENTS

| Number | Name | Date |
|---|---|---|
| 2,100,053 | Hill et al. | Nov. 23, 1937 |
| 2,215,172 | Christensen | Sept. 17, 1940 |
| 2,275,255 | Freeman | Mar. 3, 1942 |
| 2,370,582 | Rodway | Feb. 27, 1945 |
| 2,411,406 | Affleck | Nov. 19, 1946 |
| 2,429,194 | Price | Oct. 14, 1947 |
| 2,429,196 | Price | Oct. 14, 1947 |

FOREIGN PATENTS

| Number | Country | Date |
|---|---|---|
| 512,436 | Great Britain | Sept. 15, 1939 |
| 544,643 | Great Britain | Apr. 22, 1942 |